June 18, 1929.  E. J. MERKLE  1,718,170

APPARATUS FOR MAKING COFFEE

Filed Aug. 22, 1927

Edward J. Merkle
INVENTOR.

BY

ATTORNEY.

Patented June 18, 1929.

1,718,170

UNITED STATES PATENT OFFICE.

EDWARD J. MERKLE, OF COLUMBUS, OHIO.

APPARATUS FOR MAKING COFFEE.

Application filed August 22, 1927. Serial No. 214,472.

My invention relates to apparatus for brewing coffee and, more particularly, to apparatus for holding the coffee in its proper and desired position in the vessel in which the coffee is to be brewed.

It has been customary, where coffee is brewed in large quantities as in hotels or restaurants, to filter or strain the brew through a cloth or paper in the urn or other receptacle. Such cloth or paper is preferably attached, around its outer edges, to the coffee containing means at or somewhere near the bottom of the containing means. Cloth or paper filtering and straining means are undesirable in that they are unsanitary, wear out quickly and have the additional undesirable feature of absorbing and holding a certain amount of the strength and flavor of the brew.

Furthermore, previous coffee containing means have been partly or wholly constructed of foraminous or perforated metal which has formed an integral part of the coffee containing means and has not been removable therefrom. The foraminous or perforated parts not being removable have been a source of additional expense to the user in that when the metal foraminous or perforated portion is rendered useless it necessitates the purchase of an entire new containing means.

One object of my invention is to provide a device for making coffee in which the use of cloth or paper filtering and straining means is unnecessary and wherein the foraminous or perforated portion of my device is removable from the containing means.

Another object of my invention is to provide a means for holding coffee in its desired and proper position in the urn or receptacle in which it is to be brewed which is simple in construction, is made up of a minimum number of parts and is easily removed for renewal, repair or cleaning.

A further object of my invention is to provide a coffee containing means in which the body of the containing means is constructed in a solid piece and the foraminous or perforated means is no larger than is necessary to the success of such coffee making device thereby lessening the danger of having the device become useless through injury to the foraminous or perforated portion.

Other objects of my invention may be seen in the following detailed description and the preferred embodiment of my invention is shown in the accompanying drawings wherein similar characters of reference designate corresponding parts and wherein.

Figure 1:
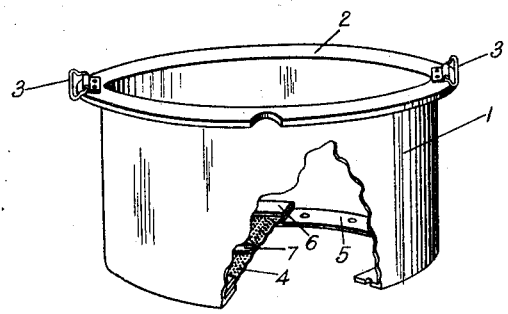
Figure 1 is a perspective view, partly broken away showing the preferred embodiment of my invention.
Figure 2:
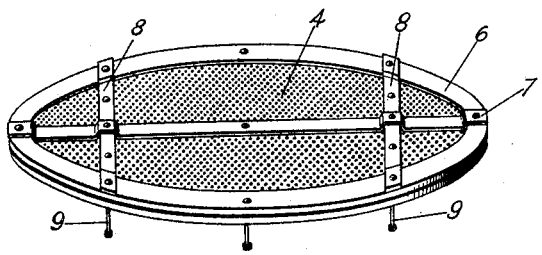
Figure 2 is a perspective view showing the foraminous or perforated portion of the coffee containing means shown in Figure 1, the frame in which this foraminous or perforated portion is disposed and braces that form a portion thereof.

With reference to the drawings I have shown a coffee container 1 that is preferably circular in shape and has a flange 2 around the top thereof on which are disposed the handles 3. The handles 3 provide a convenient means for grasping the container 1 in removing it from or placing it in an urn or other receptacle. A foraminous or perforated portion 4 is held in a frame 6 as best shown in Figure 2 and this frame rests upon a flange 5 that extends inwardly from the walls of the container 1 and is disposed around the bottom thereof. The foraminous or perforated portion 4 disposed in the frame 6 and resting upon the flange 5 forms a bottom for the container 1.

As shown in Figure 2 a brace 7 extends entirely across the portion 4 from one side to the other of the frame 6 and through substantially the center of this foraminous or perforated portion. Additional braces 8 extend across the surface of the portion 4 near the opposite end of the brace 7 and in a perpendicular relation thereto. These braces 6 and 8 are riveted or otherwise rigidly attached to the screen 4 and are held to the frame 6 by bolts 9.

The bottom member which comprises the foraminous or perforated portion 4, the frame 6 having an outer circumference substantially the same as that of the foraminous or perforated portion 4 and the braces 7 and 8 is adapted to rest upon the flange 5 of the container 1. The outer circumference of the frame 6 and the foraminous or perforated portion 4 is preferably of the same circumference as the inner circumference of the container 1 although this is not absolutely necessary. Bolts 9 extend through holes in the frame 6 and through corresponding holes in the foraminous or perforated portion 4 and the flange 5. These bolts serve the double purpose of holding the foraminous or perforated portion tightly in the frame 6 and the frame 6 tightly to the flange 5. The bolts 9 also extend through the braces 7 and 8 holding them rigidly to the frame 6. The frame 6 is preferably made in two pieces that are concentric to each other and the foraminous or perforated portion 4 is disposed between these two pieces.

Figure 3:
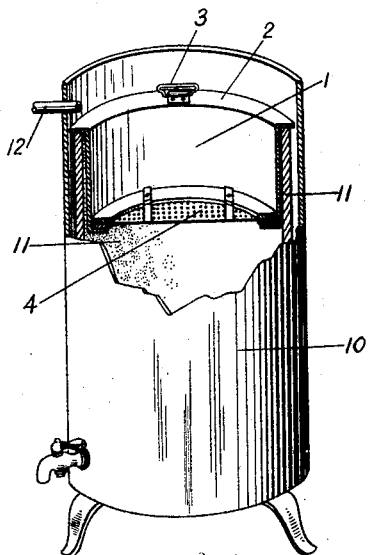
Figure 3 is a perspective view, partly broken away and partly in section showing a complete coffee-making device including my coffee containing means.

In Figure 3 of the drawings, I have shown the container 1 with all parts assembled disposed in an urn 10 although it will be understood that the coffee container 1 might be used in other receptacles. Disposed within the outer shell of this urn 10 is an inner container or jar 11 which is preferably made of earthenware or a similar material. The outwardly extending flange 2 on the top of the container 1 is adapted to rest upon the top of this inner container or jar 11 which is at a point near the top of the outer shell of the urn 10. The body of the container 1 is adapted to interfit with the inner container or jar 11 as shown in Figure 3. A pipe 12 provides a means whereby water may be injected into the urn 10 at a point above the coffee containing means although it will be understood that the water may be inserted into the urn 10 in any manner desired.

The foraminous or perforated portion 4 may be made of any material that has sufficient strength to withstand the weight of the coffee, both in dry and water-soaked condition, without bending. This foraminous or perforated portion 4 is preferably made of metal to prevent absorption thereby of any of the strength and flavor of the coffee being brewed. The perforations may be made as numerous as desired and of any form desired. Furthermore, I do not wish to be limited to the use of metal in making the body of the container 1 as the body of the container may be made of other materials as for example earthenware. A lid may be provided for the urn 10 if so desired.

By referring to the preceding description and the drawings attached hereto it will be seen that I have provided a coffee containing means wherein all of the original strength and flavor of the coffee will be retained by the brew. At the same time I have provided a coffee-containing means that is simple in construction, comprises a minimum number of parts and is easily removed and separated for renewal, repair or cleaning and one having the further desirable feature of being sanitary.

Having thus described my invention what I claim is:

1. A coffee making device comprising an outer receptacle and an inner receptacle, a coffee containing means having an outwardly extending annular flange on the top thereof adapted to rest upon the upper end of the inner receptacle and support said coffee containing means, an inwardly extending annular flange on the bottom of said containing means, and a foraminous portion adapted to rest upon said inwardly extending flange, said foraminous portion being removable from said containing means and having complemental rings on opposite sides thereof that correspond to the outer circumference of said foraminous portion, a screen between said rings, a reinforcing bar extending across the screen and over the rings, and means passing through the reinforcing bar, rings and screen for holding them in operative relation.

2. A coffee making device comprising an outer receptacle and an inner receptacle, a coffee containing means having an outwardly extending annular flange on the top thereof adapted to rest upon the upper end of the inner receptacle and support said coffee containing means, an inwardly extending annular flange on the bottom of said containing means, and a foraminous portion adapted to rest upon said inwardly extending flange, said foraminous portion being removable from said containing means and having complemental rings on opposite sides thereof that correspond to the outer circumference of said foraminous portion, a screen between said rings, a reinforcing bar extending diametrically across the screen and connected to the rings, and cross bars suitably spaced from the ends of said reinforcing bar and connected to the rings.

In testimony whereof I, hereby affix my signature.

EDWARD J. MERKLE.